(12) United States Patent
Coogan et al.

(10) Patent No.: US 12,522,939 B2
(45) Date of Patent: *Jan. 13, 2026

(54) SEALED ANODIZATION LAYER

(71) Applicant: Hamilton Sundstrand Corporation, Charlotte, NC (US)

(72) Inventors: Cody Coogan, Hoover, AL (US); Kevin R. Bordage, Westfield, MA (US); Blair A. Smith, South Windsor, CT (US); Mark A. Brege, Rockford, IL (US); Vijay V. Pujar, Rancho Santa Fe, CA (US); Claude J. Moreau, Vernon, CT (US); Steven Poteet, Ashland, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 971 days.

This patent is subject to a terminal disclaimer.

(21) Appl. No.: 17/127,121

(22) Filed: Dec. 18, 2020

(65) Prior Publication Data

US 2022/0195616 A1 Jun. 23, 2022

(51) Int. Cl.
| | |
|---|---|
| *C23C 22/30* | (2006.01) |
| *B32B 3/12* | (2006.01) |
| *C23C 22/82* | (2006.01) |
| *C25D 11/24* | (2006.01) |
| *C23C 22/00* | (2006.01) |

(52) U.S. Cl.
CPC ............. *C25D 11/246* (2013.01); *B32B 3/12* (2013.01); *C23C 22/82* (2013.01); *B32B 2603/00* (2013.01)

(58) Field of Classification Search
CPC ....... B32B 2603/00; B32B 3/12; C23C 22/82; C23C 22/30; C23C 2222/10; C25D 11/246

See application file for complete search history.

(56) References Cited

U.S. PATENT DOCUMENTS

| | | | |
|---|---|---|---|
| 5,374,347 A | 12/1994 | Pearlstein et al. | |
| 10,480,093 B2 | 11/2019 | Van Hassel et al. | |
| 10,760,164 B2 | 9/2020 | Ding et al. | |
| 11,214,692 B2 * | 1/2022 | Poteet | C09D 163/00 |
| 11,603,474 B2 * | 3/2023 | Poteet | C09D 5/084 |
| 2015/0191604 A1 | 7/2015 | Lawless et al. | |
| 2019/0169443 A1 * | 6/2019 | Poteet | C25D 11/34 |
| 2021/0115267 A1 * | 4/2021 | Poteet | C09D 5/086 |

FOREIGN PATENT DOCUMENTS

| | | |
|---|---|---|
| CN | 105951151 A | 9/2016 |
| CN | 111364083 A | 7/2020 |
| EP | 3812484 A1 | 4/2021 |

OTHER PUBLICATIONS

Extended European Search Report for EP Application No. 21213519. 8, dated May 19, 2022, pp. 1-9.

(Continued)

*Primary Examiner* — Lois L Zheng
(74) *Attorney, Agent, or Firm* — CANTOR COLBURN LLP

(57) ABSTRACT

Disclosed is a method of sealing an anodization layer including contacting the anodization layer with a solution at a temperature greater than freezing and less than 160° F. wherein the solution comprises graphene particles and a corrosion inhibitor.

9 Claims, 1 Drawing Sheet

(56) References Cited

OTHER PUBLICATIONS

Cheng, B. R. and Hao, L., "Sealing Processes of Anodic Coatings-Past, Present, and Future", Metal Finishing, Metalast International Inc., Dec. 2000, pp. 8-18.
Military Specification, "Anodic Coatings for Aluminum and Aluminum Alloys" MIL-A-8625F, "Anodic Coatings For Aluminum And Aluminum Alloys," Sep. 10, 1993, 20 pages.
Military Specification, "Anodic Coatings for Aluminum and Aluminum Alloys" MIL-A-8625F, Amendment 1 "Anodic Coatings For Aluminum And Aluminum Alloys," Sep. 10, 1993, 25 pages.
European Office Action for EP Application No. 21213519.8, dated Jan. 31, 2025, pp. 1-8.

\* cited by examiner

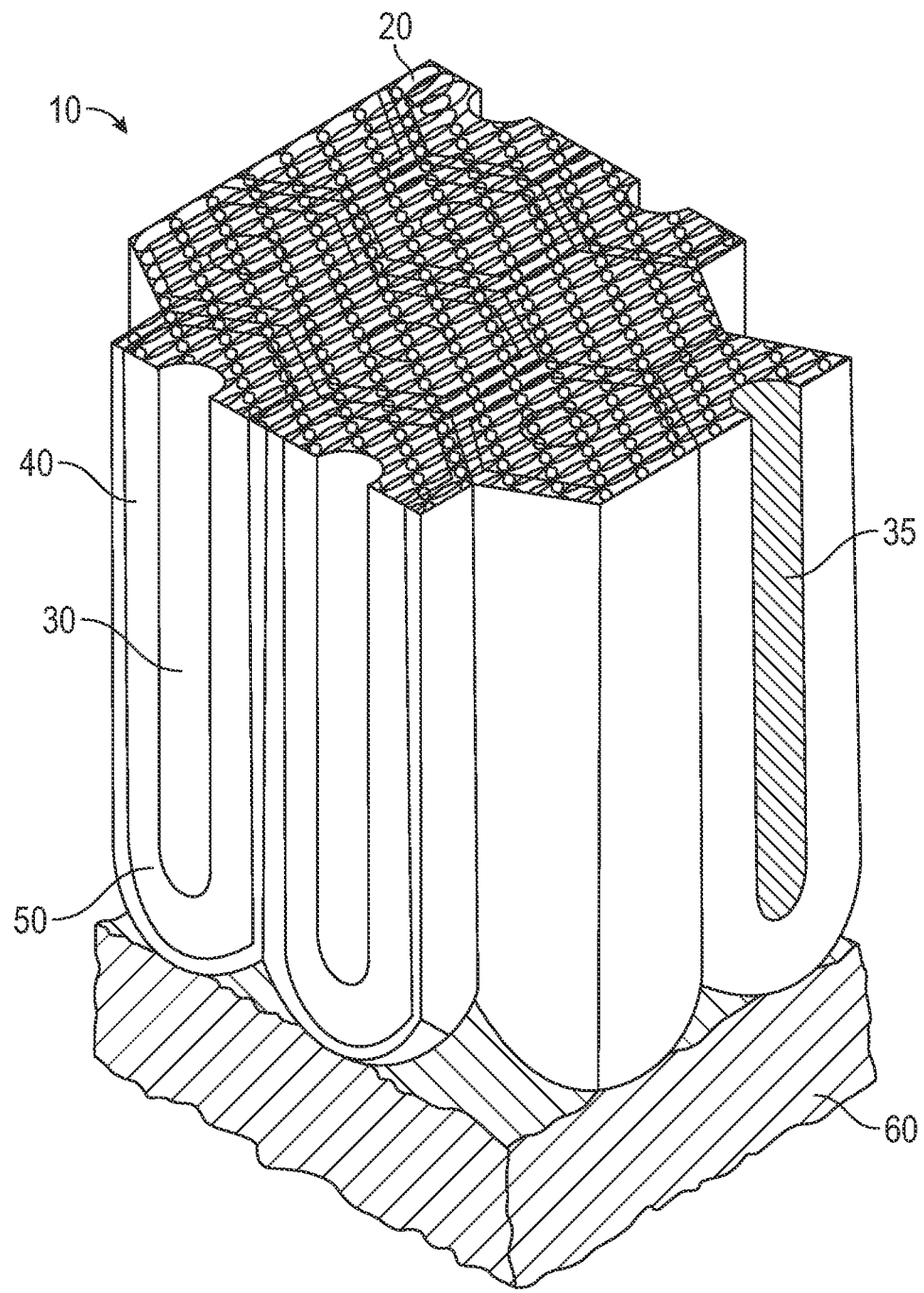

SEALED ANODIZATION LAYER

BACKGROUND

Exemplary embodiments pertain to the art of corrosion and abrasion protection for anodized metals.

Anodized metals such as high strength aluminum alloys are used in a variety of applications and can be subjected to harsh conditions. Anodization creates an electrochemically grown layer (an anodization layer) from the base metal to provide corrosion resistance for metal substrates. Anodization layers comprise porous oxides and compounds co-deposited or formed during the anodization process. The anodization layer needs to be sealed for enhanced corrosion resistance.

BRIEF DESCRIPTION

Disclosed is a method of sealing an anodization layer including contacting the anodization layer with a solution at a temperature greater than freezing and less than 160° F. wherein the solution comprises graphene particles and a corrosion inhibitor.

In addition to one or more of the features described above, or as an alternative to any of the foregoing embodiments, the corrosion inhibitor is selected from the group consisting of trivalent chromium compounds, cerium compounds, praseodymium compounds, cesium compounds, lanthanum compounds, lithium compounds, yttrium compounds, and combinations thereof.

In addition to one or more of the features described above, or as an alternative to any of the foregoing embodiments, the graphene particles are functionalized. The graphene particles may be functionalized with an organo-functionalized alkoxysilane.

In addition to one or more of the features described above, or as an alternative to any of the foregoing embodiments, the temperature is 60 to 160° F. The temperature may be 60 to 90° F.

In addition to one or more of the features described above, or as an alternative to any of the foregoing embodiments, the solution further includes an oxidizer.

In addition to one or more of the features described above, or as an alternative to any of the foregoing embodiments, the solution may have a pH of 3 to 5.

In addition to one or more of the features described above, or as an alternative to any of the foregoing embodiments, the corrosion inhibitor includes a trivalent chromium compound and the solution further comprises an oxidizer. The oxidizer may be peroxide or permanganate.

In addition to one or more of the features described above, or as an alternative to any of the foregoing embodiments, the method further includes contacting the anodization layer with an oxidizer after contact with the solution.

Also disclosed is a sealed anodization layer comprising graphene particles and a corrosion inhibitor.

In addition to one or more of the features described above, or as an alternative to any of the foregoing embodiments, the corrosion inhibitor is selected from the group consisting of trivalent chromium compounds, cerium compounds, praseodymium compounds, cesium compounds, lanthanum compounds, lithium compounds, yttrium compounds, and combinations thereof.

In addition to one or more of the features described above, or as an alternative to any of the foregoing embodiments, the graphene particles are functionalized. The graphene particles may be functionalized with an organo-functionalized alkoxysilane.

In addition to one or more of the features described above, or as an alternative to any of the foregoing embodiments, the sealed anodization layer has areas having a thickness of 0.000025 to 0.001 inches (0.6 to 25 micrometers) and areas having a thickness of 0.0007 to 0.010 (17.8 to 250 micrometers).

Also disclosed is an article having a sealed anodization layer wherein the sealed anodization layer comprises graphene particles and a corrosion inhibitor.

In addition to one or more of the features described above, or as an alternative to any of the foregoing embodiments, the sealed anodization layer has areas having a thickness of 0.000025 to 0.001 inches (0.6 to 25 microns) and areas having a thickness of 0.0007 to 0.010 (17.8 to 250 microns).

In addition to one or more of the features described above, or as an alternative to any of the foregoing embodiments, the article is an air cycle machine, fuel control, valve body, metering valve, stator vane, fan case, or shroud for a gas turbine engine.

BRIEF DESCRIPTION OF THE DRAWINGS

The following descriptions should not be considered limiting in any way.

The FIGURE shows an anodization layer.

DETAILED DESCRIPTION

A detailed description of one or more embodiments of the disclosed apparatus and method are presented herein by way of exemplification and not limitation with reference to the FIGURE.

Anodizing is an electrolytic passivation process where a metal substrate operates as an anode in an electrical circuit and an anodization layer is formed or grows on the surface of the article as a result of converting a metallic element (that is part of the metal substrate) to oxides and related compounds. The anodizing process is commonly used to create an anodization layer on aluminum alloys. Anodization of aluminum alloys can be performed for example using industry standard processes such as those described in MIL-A-8625 Anodic Coatings for Aluminum and Aluminum Alloys. The process parameters are typically carefully monitored and controlled to create an appropriate anodization layer thickness and microstructure. For example, the anodization process may be controlled to produce a thin anodization layer or a thick anodization layer, as described in MIL-A-8625. Thin anodization layers are sometimes referred to as Type I, Type II, IC, and Type IIB. Thick anodization layers are sometimes referred to as Type III. The thicker anodization layer (Type III) is often referred to as a hard coat, and is often desired for wear and abrasion resistance. Frequently, a hard coat is only desired in certain locations and a mask is needed to protect other areas. A thin anodization layer is created on the article and sealed to form a mask. The thin anodization layer is removed from the areas requiring a hard coat and the hard coat is formed by a second anodization process, typically in a different electrolyte.

Anodization to form the hard coat degrades the corrosion resistance of the thin anodization layer. It has been found that resealing the thin anodization layer and the hard coat degrades the abrasion resistance of the hard coat. Thus it is difficult to achieve a combination of abrasion resistance and corrosion resistance with an article having a combination of a thin anodization layer and a hard coat. Even when an article only has a hard coat it is difficult to achieve the combination of corrosion resistance and abrasion resistance as currently available sealing technologies can have a negative impact on the abrasion resistance of the hard coat.

Disclosed herein is a method of sealing an anodization layer. The anodization layer may be a thin anodization layer (having a thickness of 0.000025 to 0.001 inches (0.6 to 25 micrometers)), a hard coat (having a thickness of 0.0007 to 0.010 inches (17.8 to 250 micrometers)), or a combination thereof. In some embodiments the anodization layer is a hard coat. The method includes contacting the anodization layer with a solution at a temperature that is greater than freezing and less than or equal to 160° F. or less than 90° F. The temperature can be 60 to 160° F. or 60 to 90° F. The solution is aqueous and includes graphene particles and a corrosion inhibitor. Exemplary contact times include 5 to 30 minutes. The solution may have a pH of 3 to 5 or 3.6 to 4.2.

Graphene particles are nanoplatelets (have a height that is less than any other linear dimension) and have average diameters of 1 to 25 micrometers. When dispersed in solution, the graphene particles are exfoliated to an average thickness of one to twenty layers or one to four layers. The graphene may be functionalized by combining with a compatible functionalizing agent, such as organo-functionalized alkoxysilanes.

Graphene particles have the ability to prevent corrosion as well as to promote abrasion resistance by enhancing lubricity. Graphene particles are two dimensional nanomaterials that can act as sheet barriers at the top of the pores of the anodization layer or hard coat. The surface areas of the graphene particles may help protect the anodization layer from moisture, gases and ions that could corrode the surface of underlying metal. It is believed that when a functionalizing agent is present on the graphene the functionalizing agent may interact with the anodization layer in the pores of the layer thereby anchoring the graphene particles to the surface of the anodization layer.

Interactions of graphene particles with corrosion inhibitors can lead to increased anti-corrosion compared to the corrosion inhibitors alone. Without being bound by theory, it is believed that graphene particles can sequester corrosion inhibitors. For example, graphene particles can adsorb corrosion inhibitors from solution to form a corrosion inhibitor enhanced layer. Additionally, silane-functionalized graphene particles, assisted by the local environment, may oxidize trivalent chromium compounds used as a corrosion inhibitor into hexavalent chromium in situ. Hexavalent chromium is well known to provide excellent corrosion protection.

Graphene particles have also shown the ability to increase hydrophobicity of a substrate, further protecting from corrosion. Graphene solutions can increase the contact angle of water on a surface of a substrate by 23 to 31 degrees, lowering the surface energy and preventing moisture from coming into contact with the substrate.

The graphene particles are present in the solution in an amount of 0.01 wt % to 10 wt %, based on the total weight of the solution. Within this range they may be present in an amount of 0.1 wt % to 5 wt %, or 0.1 wt % to 2 wt %.

Exemplary corrosion inhibitors include trivalent chromium compounds, cerium compounds, praseodymium compounds, cesium compounds, lanthanum compounds, lithium compounds, yttrium compounds, and combinations thereof. The corrosion inhibitor may be present in the solution in an amount of 10 to 50,000 ppm based on the total weight of the solution. Within this range the corrosion inhibitor may be present in an amount of 50 to 10,000 ppm, or 50 to 4,000 ppm.

Additionally, the solution may include an oxidizer such as peroxide or permanganate in combination with trivalent chromium compounds. It is further contemplated that the anodization layer may be contacted with an oxidizer such as peroxide after contact with the above described solution.

It is further contemplated that a solution including a trivalent chromium compound and peroxide may be used in addition to a solution including graphene nanoplatelets and a corrosion inhibitor. The two solutions may be used sequentially.

The anodization layer may be machined, cleaned or a combination thereof prior to sealing. As will be appreciated by a person of skill in the art, machining after sealing may remove a portion of the sealed surface and diminish the effectiveness.

The above described methods result in an anodized coating including graphene nanoplatelets and a corrosion inhibitor. The FIGURE illustrates an anodization layer 10 having pores 30 which include a cell wall 40 and a bottom 50 (also described as a barrier layer). Some or all of the pores may have corrosion inhibitor 35 located in the pore. The FIGURE also illustrates a layer of graphene particles 20 on top of the anodization layer 10. The anodization layer 10 covers the metal substrate 60.

The anodized coating is useful in a range of applications including air cycle machines, fuel controls, valve bodies, metering valves, stator vanes, fan cases and shrouds for gas turbine engines or any aluminum part requiring a combination of a corrosion protective layer, a hard, abrasion resistant coating, or combination of both.

The anodized coating may be formed on a metal substrate such as aluminum or an aluminum alloy. Exemplary aluminum alloys include the 2000, 3000, 5000, 6000, and 7000 series.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of sealing an anodization layer comprising contacting the anodization layer with a solution at a temperature greater than freezing and less than 160° F. wherein the solution comprises graphene particles and a corrosion inhibitor;
   wherein the corrosion inhibitor comprises a trivalent chromium compound and the solution further comprises an oxidizer;
   wherein the oxidizer comprises peroxide or permanganate.

2. The method of claim 1, wherein the corrosion inhibitor is selected from the group consisting of trivalent chromium compounds, cerium compounds, praseodymium compounds, cesium compounds, lanthanum compounds, lithium compounds, yttrium compounds, and combinations thereof.

3. The method of claim 1, wherein the graphene particles are functionalized.

4. The method of claim 3, wherein the graphene particles are functionalized with an organo-functionalized alkoxysilane.

5. The method of claim 1, wherein the temperature is 60 to 160° F.

6. The method of claim 1, wherein the temperature is 60 to 90° F.

7. The method of claim 1, wherein the solution further comprises an oxidizer.

8. The method of claim 1, wherein the solution has a pH of 3 to 5.

9. The method of claim 1, further comprising contacting the anodization layer with an oxidizer after contact with the solution.

\* \* \* \* \*